United States Patent Office 3,565,646
Patented Feb. 23, 1971

3,565,646
METHOD OF MAKING REFRACTORY MATERIAL
Lloyd M. Housh, Santa Clara, Calif., assignor to Kaiser Aluminum & Chemical Corporation, Oakland, Calif., a corporation of Delaware
No Drawing. Filed Nov. 24, 1967, Ser. No. 685,299
Int. Cl. C04b 35/44
U.S. Cl. 106—65        27 Claims

ABSTRACT OF THE DISCLOSURE

Aluminous refractory material such as spinel and mullite grains and calcium aluminate cement can be made by adding foreign refractory oxide materials such as magnesia, kaolin, lime, etc. to an alumina solution and then precipitating aluminum hydroxide from the solution. The process of dissolving aluminous material in sodium hydroxide and precipitating aluminum hydroxide with seed material is a suitable method for use in the invention. The intimate admixture of alumina hydroxide and added refractory oxide is fired to form a refractory material.

BACKGROUND OF THE INVENTION

In making complex refractory oxide materials, for example to use in making refractory shapes, grains, cements and the like, it is generally necessary to form the complex oxides from simpler oxides. For example, spinel ($MgO \cdot Al_2O_3$) is usually made by firing an admixture of magnesia (MgO) or magnesia-yielding material and alumina ($Al_2O_3$) or alumina-yielding material. In order to promote reaction between these solid, inorganic materials, it has been necessary to heat them to relatively high temperatures, for example to from 1800 to 2000° C. or more. Also, it is customary to enhance the rate and degree of reaction by using relatively finely divided materials, but this usually necessitates grinding of the simple oxide materials. Despite the high temperatures and fine grinding heretofore used in forming complex refractory oxides by reaction of simpler oxides, it is still often impossible to secure a product of sufficiently high density or, conversely stated, sufficient low porosity. Thus, the refractories industry is still searching for a better method of forming complex refractory oxides from simpler oxides, a method which will yield a product of high density and low porosity at practically feasible firing temperatures and without the necessity for long and expensive grinding.

SUMMARY OF THE INVENTION

It has now been found, according to this invention, that dense aluminous refractory material can be formed by (1) making a solution of alumina in a liquid solvent; (2) adding a foreign, finely divided solid particulate refractory oxide to the aluminous solution; (3) immediately thereafter precipitating an aluminous compound from the solution; (4) recovering the aluminous compound and refractory oxide in intimate admixture; and (5) firing the admixture.

DETAILED DESCRIPTION

The aluminous solution can be formed by any of several methods well known in the art. For example, it can be made by dissolving alumina or aluminum hydroxide, but it will generally be found more economical to make it by dissolving a less pure, and hence ordinarily less expensive, material such as natural bauxite. The aluminous liquor formed by dissolving bauxite in sodium hydroxide, as in the well known Bayer process of producing alumina, has been found to be suitable for use in this invention. As is well known, such Bayer process solutions typically contain from 100 to 180 g./l. alumina (A) and from 140 to 240 g./l. caustic soda (C), where C is the NaOH plus $NaAlO_2$ expressed as sodium carbonate ($Na_2CO_3$), the ratio (A/C) of alumina to soda being from 0.6 to 0.7. It will be understood, however, that other solvents can be used, and that higher A/C ratios, for example 0.9, can be used.

The finely divided refractory oxide material which is added to the aluminous solution should have a specific surface of at least 10,000 cm.$^2$/g. (1 m.$^2$/g.) and preferably has 10 m.$^2$/g. or more. It will be substantially insoluble in the aluminous solution used under the conditions of the process. The particular material added will depend on the type of aluminous refractory oxide it is desired to produce. For example, if the end product is to be spinel ($MgAl_2O_4$) grain, the added foreign material will be magnesia or magnesium hydroxide or some other material, for example a magnesium carbonate or a hydrous magnesium carbonate, which will yield magnesia upon firing. Similarly, if it is desired to produce mullite grain, the foreign material added will be kaolinite, a naturally occurring alumino-silicate mineral, or silica, for example volatilized silica or fine sand, or some other material which will yield silica or silica and alumina upon firing. It will be understood, however, that mixtures of alumina and silica containing from 10% to 90%, by weight of the total mixture, alumina can be formed by this method.

Likewise, if it is desired to produce calcium aluminate refractory cement, e.g. one with an $Al_2O_3$:CaO mole ratio of from 1:1 to 9:1, the foreign material added will be a calcium-containing material such as calcium oxide (CaO) itself, calcium hydroxide, or some other calcium-yielding material or even a calcium aluminate material. By the term "refractory oxide" is meant not only simple oxides themselves (e.g., magnesia, silica), but also materials which will yield such simple oxides upon firing, e.g., magnesium hydroxide, kaolin and the like.

It will be understood that this method can also be used to produce a high alumina refractory grain containing only small amounts, for example from 0.1 to 1% by weight, of other refractory oxide materials. For example, the added foreign material can be an additive such as titania ($TiO_2$) or zirconia ($ZrO_2$) or a manganese compound, for example $MnO_2$, and the resulting admixture can be used to form alumina grain, these added materials, as is well known in the art, aiding in the sintering of the alumina grain. Of course, the method of this invention can also be used to add greater amounts of titania to alumina, for example enough to form aluminum titanate.

The amount of added foreign material will depend on the composition of the complex refractory oxide to be produced and on the amount of aluminous compound produced in the precipitation step. As is well known, the amount of alumina hydroxide precipitated from a sodium aluminate solution depends on the reaction conditions, the temperature, temperature change, if any, degree of dilution, the amount of seed material used, as well as the time allowed for the precipitation before the supernatent liquid is removed. Thus, for example, if it is desired to produce a spinel grain, the amount of magnesia or magnesia-yielding material added will be such as to produce, together with the precipitated aluminous compound, an admixture having a chemical composition such that the mole ratio of MgO to $Al_2O_3$ is 1:1, more or less, it being understood that both excess MgO and excess $Al_2O_3$ form solid solutions with spinel. However, the method can be used to form mixtures of magnesia and alumina containing from 10% to 90%, by weight of the total mixture, MgO.

The precipitation step is carried out immediately following the addition of the foreign material and may be accomplished by any of several methods well known in the art. For example, a solution of alumina dissolved in sodium hydroxide at or near the boiling point precipitates aluminum hydroxide when diluted with a larger quantity of water, for example 55 parts of water to one part of sodium aluminate liquor on a volume basis. Alternatively, as is conventional in the Bayer process, the precipitation can be the result of adding "Seed" material, commonly aluminum trihydrate, $Al(OH)_3$, itself in very finely divided form, for example substantially all less than 50 microns in size. Aluminum hydroxide can also be precipitated by cooling the solution or by adding acid to it, or by adding $CO_2$.

It has been found, when the seeding method of precipitation is used, that there is a relationship between the A/C ratio of the aluminous solution and the specific surface of the seed material required to successfully precipitate aluminum hydroxide. Thus, when the A/C ratio of the aluminous solution is 0.8 or higher, successful precipitation is achieved with an aluminum hydroxide seed having a specific surface of less than 1 m.$^2$/g. On the other hand, when the A/C ratio of the aluminous solution was about 0.7, precipitation did not take place when seed with a specific surface of about 1 m.$^2$/g. was used but did take place when an aluminum hydroxide seed having a specific surface of about 16 m.$^2$/g. was used.

It has also been found that the intimate admixture of aluminous compound and foreign additive produced by this process can be used as seed material in a subsequent precipitation.

After precipitation by seeding, the spent liquor typically has an alumina concentration of from about 30 to about 150 g./l., a caustic soda concentration, expressed as sodium carbonate, of from about 150 to about 260 g./l., and an A/C ratio of from about 0.2 to about 0.5.

While the phenomena of the process of this invention are not entirely understood and while it is not desired to be bound by any particular theory, it is believed that the added foreign material provides a base upon which aluminum hydroxide can precipitate in intimate contact with the foreign material. In the case of foreign materials which exist in the form of flocs, for example magnesium hydroxide, or in the form of crystal structures with exchange sites, for example kaolinite, it is believed that the precipitated aluminum hydroxide is located within the flocs or on the exchange sites of the foreign material and thus is in very intimate admixture with the foreign material. Thus, the process of this invention can be referred to as "occluded precipitation." It is further believed that as a result of this very intimate admixture, the rate and extent of reaction between the aluminum hydroxide and the foreign material is greatly accelerated and there results, upon firing the admixture, a very dense refractory oxide material.

The material formed as described above is fired, for example at a temperature of about 1600° C. or higher, after compaction if desired to form a dense refractory grain. The resulting refractory oxide material can be processed further, according to steps well known in the art. For example, if a calcium aluminate cement is desired, the fired calcium aluminate material, which can be fired at a temperature as low as 1300° C., can be ground so as to have a specific surface of at least 3000 cm.$^2$/g. to form a hydraulic cement. Similarly, the fired material can be crushed or ground and formed into refractory shapes or used to make bulk refractory mixes, for example gunning, casting or ramming mixes.

One of the advantages of the method of this invention is that it eliminates the necessity for the calcining and milling steps customarily used in the preparation of mullite, spinel and other refractory materials. In fact, it appears that such steps are undesirable in the practice of this invention. The elimination of these steps has obvious economic advantages.

Example 1

As an example of the practice of this invention, 70 grams of gibbsite, $Al(OH)_3$, were dissolved in 50 ml. of reagent grade 50 wt. percent aqueous NaOH at the boiling point. The aluminous solution was added to 3.8 liters of $H_2O$ at 21° C. The diluted solution was agitated for 20 hours and the precipitate, aluminum trihydrate in bayerite form, was collected by filtration. The filter cake was washed with water and dried at 120° C. This entire process was repeated twice, once with 16 grams of $Mg(OH)_2$ dispersed in the 3.8 liters of $H_2O$ prior to addition of the concentrated aluminous solution and once with 30 grams of kaolin. The $Mg(OH)_2$ had a surface area of 20 m.$^2$/g. and the kaolin a surface area of 25 m.$^2$/g. After drying, the filter cakes with additives were screened through a 100 mesh Tyler sieve, 10% water by weight was added, and compacts were pressed at 10 tons/in.$^2$. The dried compacts were sintered at 1750° C. for 60 minutes. The spinel grain compacts contained 62 wt. percent $Al_2O_3$ and 36.6 wt. percent MgO and had a bulk porosity of 3.7 volume percent. The mullite grain, analyzing 70.2% $Al_2O_3$ and 28.1% $SiO_2$, had a bulk porosity of 5.7 volume percent.

Example 2

As a further example of the process of this invention, 136 grams of the same gibbsite used in Example 1 were dissolved in 1000 ml. of spent liquor from a Bayer process plant in a hydrothermal bomb at 250° C. and a total pressure of about 500 p.s.i.g. The spent liquor had an alumina (A) content of 38.6 g./l. and a caustic soda (C) content of 159.0 g./l., expressed as sodium carbonate, and an A/C ratio of 0.24. After dissolution of the gibbsite at 250° C. the solution contained 113.4 g./l. alumina, 141.7 g./l. caustic soda expressed as $Na_2CO_3$, and had an A/C ratio of 0.80. After solution, the pregnant liquor was cooled to about 21° C., 2.5 grams of seed $Al(OH)_3$ and 29 grams of $Mg(OH)_2$ was added, and the slurry was agitated for 22 hours. The source of seed was the bayerite produced in the first precipitation of Example 1. The seed had a surface area of 3.98 m.$^2$/g. The agitated slurry was filtered, water washed, and dried at 120° C. The undiluted filtrate, spent liquor, had an A/C ratio of 0.59. In a second precipitation test a pregnant liquor was generated in the same manner and with the same concentrations and volume as in the first test of this example. To the pregnant liquor was added 2.5 g. of the same seed $Al(OH)_3$ and 74 g. of kaolin calcined at 900° C. for 60 minutes. The slurry was agitated for 22 hours at 21° C., filtered, washed with water, and dried at 120° C. The undiluted filtrate, spent liquor, had an A/C ratio of 0.30. The dried cakes from both precipitations were passed through a 100 mesh Tyler screen, 10% water, by weight, was added and compacts were pressed at 10 tons/in.$^2$. After drying, the compacts were fired at 1750° C. for 60 minutes. The spinel grain, containing 62.6% $Al_2O_3$ and 36.0% MgO, had a bulk porosity of 3.1 volume percent. The mullite grain, containing 64.6% $Al_2O_3$ and 33.8% $SiO_2$, had a bulk porosity of 11.6 volume percent.

The preceding examples of materials made according to this invention are to be compared with similar tests wherein aluminum hydroxide was precipitated as in Example 1 but without any prior addition of a foreign refractory oxide material. Instead, the same amounts of magnesium hydroxide (comparison test A) and of kaolin (comparison test B) were added to the aluminum hydroxide after precipitation and blended therewith by tumbling as a slurry for 18 hours. These mixtures were fired in the same manner as were the intimate admixtures of Example 1. The porosity of the spinel formed after firing was 16.0%, to be compared with 3.7% porosity for the spinel formed in Example 1 according to this invention, and the mullite formed had a porosity of 11.4%, to be compared with 5.7% porosity for the mullite formed in Example 1 according to this invention.

Similarly, aluminum hydroxide was precipitated as in Example 2, but without any addition of foreign refractory oxide material prior to precipitation. To this precipitated aluminum hydroxide were added the same magnesium hydroxide (comparison test C) and kaolin (comparison test D) as were used in Example 2, and these mixtures blended by tumbling as a slurry for 18 hours. After the compacted mixtures were fired for the same time at the same temperature as in Example 2, the spinel formed had a porosity of 11.1%, to be compared with a porosity of 3.1% for the spinel formed in Example 2 according to this invention, and the mullite had a porosity of 29.7%, to be compared with a porosity of 11.6% for the mullite formed in Example 2 according to this invention.

Example 3

As a still further example of the practice of this invention, Bayer process spent liquor was enriched by the addition of gibbsite to achieve an initial A/C ratio of 0.80 and rotated in a hydrothermal bomb at 250° C. and 500 p.s.i. To 250 mm. portions of the enriched liquor were added the various additives shown in column 1 of Table I, the specific surfaces of the additives being shown in column 2 and the amounts of the additives being shown in column 3. At the same time, the amounts of bayerite seed shown in column 4 were also added. The bayerite seed was prepared as in the first precipitation of Example 1. After addition of the seed, precipitation took place in bombs at ambient temperature and pressure, with tumbling, over the period of time indicated in column 5. The resulting solids were filtered and dried, the total amount of product obtained being indicated in column 6. The specific surfaces of the products are shown in column 7. The dried products were compacted and fired at 1750° C. for one hour, after which they had the densities shown in column 8 and the porosities shown in column 9. Chemical analyses of the fired material are shown in columns 10, 11 and 12. Columns 13 and 14 show the actual mole ratio in the fired material. These values are to be compared with a theoretical mole ratio of 1.00 for ideal magnesium aluminate spinel and of about 0.67 for an ideal mullite composition.

In comparison tests, certain of the same additive materials used in Example 3, as shown in column 1 of Table II, were added in the amounts shown in column 2 to the amounts of bayerite seed material shown in column 3, and the two mixed as a slurry. After mixing, these batches were processed in exactly the same manner as the material produce in the bomb tests of Example 3, that is to say, they were filtered, dried compacted and fired at 1750° C. for one hour. The specific surfaces of the comparison materials prior to firing are shown in column 4 of Table II and the densities and porosities after firing are shown in columns 5 and 6. Columns 7, 8 and 9 show the chemical compositions of the fired comparison materials.

Comparison of the figures in column 9 of Table I with those in column 6 of Table II indicates that the fired materials produced according to this invention had porosities as much as an order of magnitude less than similar materials produced by prior conventional mixing and firing methods.

TABLE II

| (1) | | (2) | (3) | (4) | (5) | (6) | (7) | (8) | (9) |
|---|---|---|---|---|---|---|---|---|---|
| Additive | | | | | Fired | | Analysis (weight percent) | | |
| Type | | Amount (g.) | Bayerite, amount (g.) | Specific surface (m.²/g.) | Density (g./cc.) | Porosity (vol. percent) | SiO₂ | Al₂O₃ | MgO |
| Mg(OH)₂ | | 6.05 | 15 | 6.44 | 2.40 | 32.4 | -------- | 70.4 | 28.5 |
| MgO | | 6.05 | 15 | 12.43 | 2.51 | 29.6 | -------- | 73.0 | 27.02 |
| Volatilized silica | | 3.83 | 15 | 5.48 | 1.98 | 37.5 | 26.7 | 71.9 | -------- |
| Celite | | 3.78 | 15 | 4.34 | 1.97 | 37.7 | 23.5 | 75.2 | -------- |

In the specification and claims, percentages and parts are by weight unless otherwise indicated, except that porosities are expressed in volume percent. Analyses of mineral components are reported in the usual manner, expressed as simple oxides, e.g., MgO SiO₂, although the components may actually be present in various combinations, e.g., as a magnesium silicate.

Having described the invention,
What is claimed is:

1. The method of making a dense aluminous refractory material comprising: (a) dissolving alumina in a liquid solvent to produce a solution containing at least about 100 g./l. Al₂O₃; (b) adding to the aluminous solution produced in step (a) at least one finely divided solid particulate oxygen-containing refractory-yielding material which is substantially insoluble in the aluminous solution; (c) immediately thereafter precipitating from the solution an aluminous oxide compound in intimate admixture with the added material; (d) separately recovering said aluminous oxide compound and said added material in intimate admixture; and (e) firing said admixture to form a dense refractory material.

2. Method according to claim 1 wherein the alkali metal hydroxide is sodium hydroxide.

3. Method according to claim 2 wherein the concentration of alumina in the solution of step (a) is from about 100 to about 180 g./l. the concentration of caustic soda, expressed as sodium carbonate, is from about 140 to about 240 g./l., and the ratio of alumina to caustic soda is from about 0.6 to about 0.9, and wherein after the precipitation of step (c) the alumina concentration of the spent liquor is from about 30 to about 150 g./l., the concentration of caustic soda, expressed as sodium carbonate, is from about 150 to about 260 g./l., and the

TABLE I

| (1) | (2) | (3) | (4) | (5) | (6) | (7) | (8) | (9) | (10) | (11) | (12) | (13) | (14) |
|---|---|---|---|---|---|---|---|---|---|---|---|---|---|
| Additive | | | | | Product | | Fired | | | Analysis (weight percent) | | Mole ratio | |
| Type | Specific surface (m.²/g.) | Amount (g.) | Amount Seed (g.) | Pptn. time (hr.) | Amount (g.) | Specific surface (m.²/g.) | Density (g./cc.) | Porosity (vol. percent) | SiO₂ | Al₂O₃ | MgO | MgO/ Al₂O₃ | SiO₂/ Al₂O₃ |
| Mg(OH)₂ | 18.73 | 9.83 | 1.42 | 18 | 33.3 | 9.68 | 3.4 | 3.8 | -------- | 71.0 | 29.0 | 1.03 | -------- |
| MgO | 14.20 | 6.93 | 1.42 | 18 | 24.8 | 8.55 | 3.4 | 5.0 | -------- | 70.1 | 29.0 | 1.05 | -------- |
| Volatilized silica | 25.85 | 10.34 | 3.37 | 18 | 49.7 | 9.89 | 2.8 | 11.0 | 26.3 | 72.4 | -------- | -------- | 0.62 |
| Celite | 19.84 | 11.54 | 3.37 | 21 | 53.8 | 9.09 | 3.0 | 6.6 | 23.5 | 75.2 | -------- | -------- | 0.53 |
| Ca(OH)₂ | 20.08 | 3.54 | 1.42 | 21 | 9.7 | 9.55 | -------- | -------- | -------- | -------- | -------- | -------- | -------- |
| CaO | 3.58 | 2.61 | 1.43 | 21 | 7.1 | 10.53 | -------- | -------- | -------- | -------- | -------- | -------- | -------- | ratio of alumina to caustic soda is from about 0.2 to about 0.5.

4. Method according to claim 2 wherein the precipitation of step (c) is carried out by adding finely divided aluminum hydroxide seed material to the solution.

5. Method according to claim 4 wherein the added aluminum hydroxide seed material is substantially all less than 50 microns in size.

6. Method according to claim 4 wherein the amount of aluminum hydroxide seed material added is from 5 to 80 g./l.

7. Method according to claim 2 wherein precipitation step (c) is carried out by diluting the solution formed in step (a) with water.

8. Method according to claim 7 wherein said dilution is carried out by adding about 55 volumes of water to one volume of the alumina solution.

9. Method according to claim 1 wherein the added material has a surface area of at least 1 m.$^2$/g.

10. Method according to claim 9 wherein said added material is at least one material selected from the group consisting of kaolin, MgO-yielding material, CaO-yielding material, a manganese compound, $TiO_2$ and $ZrO_2$.

11. Method according to claim 10 wherein said added material is kaolin.

12. Method according to claim 11 wherein the amount of kaolin added and the amount of aluminous oxide compound precipitated are such as to yield a mixture containing from 10% to 90%, by weight of the total mixture on the ignited basis, alumina.

13. Method according to claim 12 wherein the mixture produced has an $Al_2O_3$:$SiO_2$ mole ratio of approximately 3:2.

14. Method according to claim 13 wherein the admixture is fired at a temperature of at least about 1600° C.

15. Method according to claim 14 wherein said admixture is compacted prior to firing.

16. Method according to claim 10 wherein said added material is magnesium hydroxide.

17. Method according to claim 16 wherein the amount of magnesium hydroxide added and the amount of aluminous oxide compound precipitated are such as to yield a mixture containing from 10% to 90%, by weight of the total mixture on the ignited basis, MgO.

18. Method according to claim 17 wherein the mixture has an MgO:$Al_2O_3$ mole ratio of approximately 1:1.

19. Method according to claim 18 wherein the admixture is fired at a temperature of at least about 1600° C.

20. Method according to claim 19 wherein said admixture is compacted prior to firing.

21. Method according to claim 10 wherein said added material is $TiO_2$.

22. Method according to claim 21 wherein the amount of $TiO_2$ added and the amount of aluminous oxide compound precipitated is such as to yield a product having, on the ignited basis, a $TiO_2$ content of from 0.1 to 1% by weight.

23. Method according to claim 10 wherein said added material is a CaO-yielding material.

24. Method according to claim 23 wherein the amount of CaO-yielding material added and the amount of aluminous oxide compound precipitated are such as to yield a product having a CaO:$Al_2O_3$ mole ratio of from 1:1 to 1:9.

25. Method according to claim 24 wherein the admixture is fired at a temperature of at least about 1300° C., and the fired product is ground to a fineness such that it has a surface area of at least 3,000 cm.$^2$/g.

26. Method according to claim 25 wherein said admixture is compacted before firing.

27. Method according to claim 1 wherein the solvent for the alumina is an aqueous solution of alkali metal hydroxide.

References Cited

UNITED STATES PATENTS

| | | | |
|---|---|---|---|
| 2,805,167 | 9/1957 | McCreight et al. | 106—62 |
| 3,151,993 | 10/1964 | Bundy | 106—308–I |
| 3,304,153 | 2/1967 | Bakker et al. | 106—62 |
| 3,316,108 | 4/1967 | Blomberg | 106—62 |
| 3,409,454 | 11/1968 | Andrew et al. | 106—308–I |

FOREIGN PATENTS

| | | | |
|---|---|---|---|
| 697,231 | 9/1953 | Great Britain | 106—62 |

JAMES E. POER, Primary Examiner

U.S. Cl. X.R.

106—57, 62, 63